US012259668B2

(12) United States Patent
Iwami

(10) Patent No.: US 12,259,668 B2
(45) Date of Patent: Mar. 25, 2025

(54) SLIDING FIXING DEVICE AND IMAGE FORMING APPARATUS INCORPORATING THE SAME

(71) Applicant: Shuntaroh Iwami, Kanagawa (JP)

(72) Inventor: Shuntaroh Iwami, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/388,243

(22) Filed: Nov. 9, 2023

(65) Prior Publication Data

US 2024/0160128 A1 May 16, 2024

(30) Foreign Application Priority Data

Nov. 11, 2022 (JP) ................................ 2022-180934

(51) Int. Cl.
*G03G 15/20* (2006.01)

(52) U.S. Cl.
CPC ..... *G03G 15/2025* (2013.01); *G03G 15/2064* (2013.01)

(58) Field of Classification Search
USPC .......................................................... 399/329
See application file for complete search history.

(56) References Cited

U.S. PATENT DOCUMENTS 10,775,724 B1 * 9/2020 Nagata ................. G03G 15/205
2013/0034374 A1 * 2/2013 Ohtsu ................ G03G 15/2053 399/329
2013/0251419 A1 * 9/2013 Kimura .............. G03G 15/2053 399/329
2014/0241766 A1 8/2014 Ishii et al.
2017/0160683 A1 6/2017 Gon
2019/0137916 A1 * 5/2019 Sonoyama ......... G03G 15/2053

FOREIGN PATENT DOCUMENTS

JP 2009-204924 A 9/2009
JP 2010-139642 A 6/2010
JP 2014-174358 A 9/2014
JP 2014-174488 A 9/2014
JP 2014-186303 A 10/2014

OTHER PUBLICATIONS

Extended European Search Report issued Mar. 22, 2024 in European Patent Application No. 23204894.2, 7 pages.

* cited by examiner

*Primary Examiner* — Quana Grainger
(74) *Attorney, Agent, or Firm* — XSENSUS LLP

(57) ABSTRACT

The fixing device includes a fixing rotator rotatable in a rotation direction and forming a loop, a nip formation pad inside the loop, a pressure rotator pressed against the nip formation pad via the fixing rotator to form a fixing nip, a sliding sheet between the nip formation pad and the fixing rotator, and a holder. The sliding sheet covers the nip formation pad and has a nip entrance at an upstream end of the fixing nip in the rotation direction and a face contacting the fixing rotator. The holder holds an upstream end portion of the sliding sheet upstream from the nip formation pad in the rotation direction and includes a holding plate disposed on the face and separated from the nip entrance by 5 mm or more.

16 Claims, 5 Drawing Sheets

SLIDING FIXING DEVICE AND IMAGE FORMING APPARATUS INCORPORATING THE SAME

CROSS-REFERENCE TO RELATED APPLICATION

This patent application is based on and claims priority pursuant to 35 U.S.C. § 119(a) to Japanese Patent Application No. 2022-180934, filed on Nov. 11, 2022, in the Japan Patent Office, the entire disclosure of which is hereby incorporated by reference herein.

BACKGROUND

Technical Field

Embodiments of the present disclosure generally relate to a fixing device and an image forming apparatus incorporating the fixing device.

Related Art

An image forming apparatus such as a copier or a printer includes a fixing device to fix an image onto a recording medium. As such a fixing device, there is a so-called sliding fixing device. The sliding fixing device includes a fixing belt, a nip formation pad inside the loop of the fixing belt, and a pressure rotator that is rotatable and presses the nip formation pad via the fixing belt.

The sliding fixing device includes a sliding sheet covering the nip formation pad. The sliding sheet has a smaller friction coefficient with respect to the fixing belt than the nip formation pad. As a result, the fixing belt can smoothly slide on the sliding sheet.

SUMMARY

This specification describes an improved fixing device that includes a fixing rotator, a nip formation pad, a pressure rotator, a sliding sheet, and a holder. The fixing rotator forms a loop and is rotatable in a rotation direction of the fixing rotator. The nip formation pad is inside the loop of the fixing rotator. The pressure rotator is pressed against the nip formation pad via the fixing rotator to form a fixing nip between the fixing rotator and the pressure rotator. The sliding sheet is between the nip formation pad and the fixing rotator, covers the nip formation pad, and has a nip entrance at an upstream end of the fixing nip in the rotation direction and a face contacting the fixing rotator. The holder holds an upstream end portion of the sliding sheet upstream from the nip formation pad in the rotation direction. The holder includes a holding plate on the face of the sliding sheet, and the holding plate is separated from the nip entrance by 5 mm or more in the rotation direction.

This specification also describes an image forming apparatus including the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
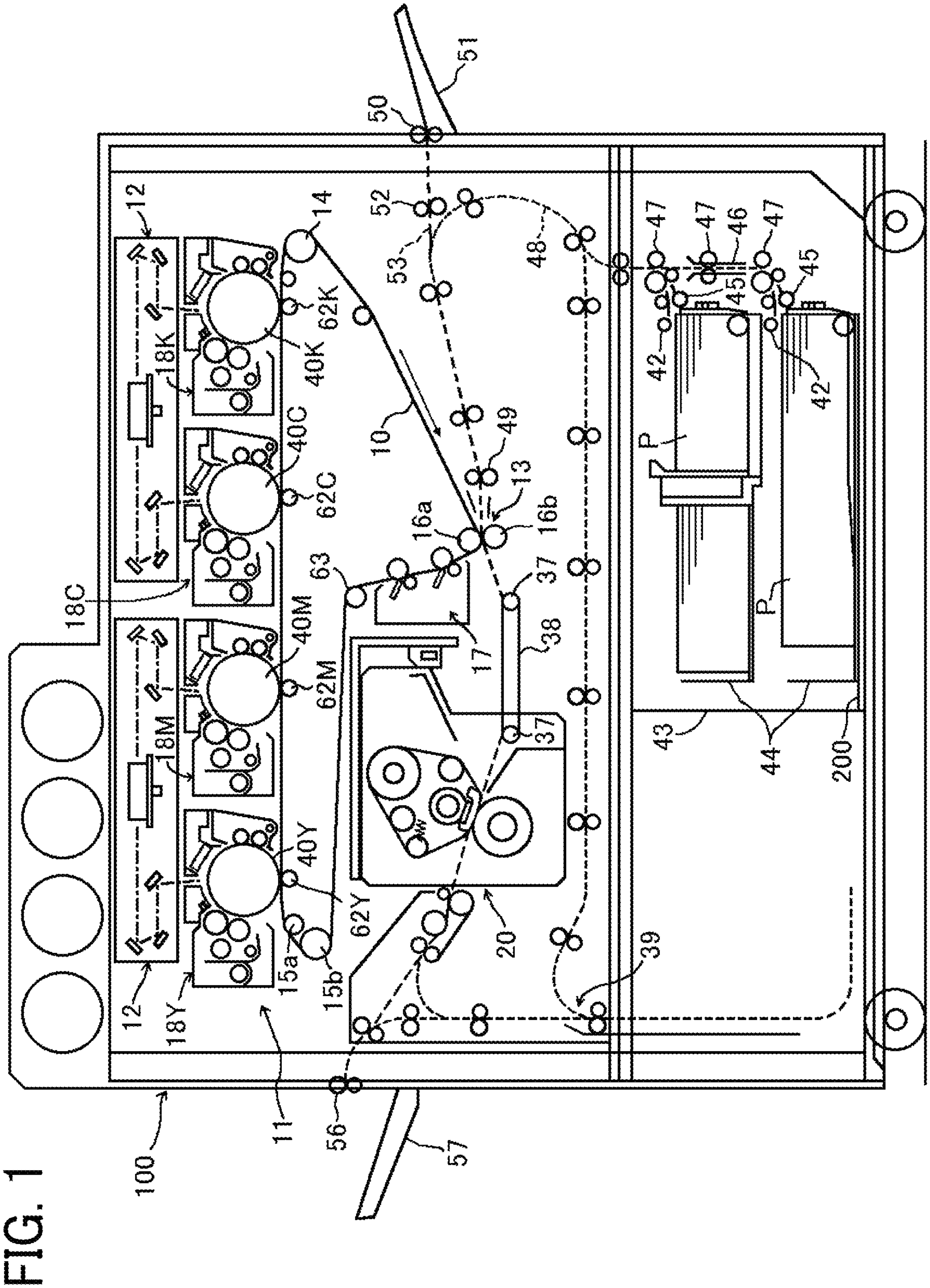
FIG. 1 is a schematic diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to drawings, descriptions are given below of embodiments of the present disclosure. In the drawings illustrating embodiments of the present disclosure, elements or components having identical or similar functions or shapes are given similar reference numerals as far as distinguishable, and redundant descriptions are omitted.

FIG. 1 is a schematic diagram illustrating an overall configuration of an image forming apparatus 100 according to an embodiment of the present disclosure.

The image forming apparatus according to the present embodiment may be, for example, a printer, a copier, and a fax machine. The image forming apparatus 100 uses toner to form a toner image on a sheet-like body and includes a fixing device to fix the toner image (an unfixed image) onto the sheet-like body. The image forming apparatus 100 according to the present embodiment employs a tandem intermediate transfer system and includes a fixing device 20 according to an embodiment of the present disclosure and a sheet feeding table 200 including sheet feeding trays 44 in a lower part of the image forming apparatus 100.

In the following description, the term "image forming apparatus" refers to an image forming apparatus that performs image formation by attaching developer or ink to a medium such as paper, an overhead projector (OHP) transparency, yarn, fiber, cloth, leather, metal, plastic, glass, wood, and ceramics. The term "image formation" indicates an action for providing (i.e., printing) not only an image having a meaning, such as texts and figures on a recording medium, but also an image having no meaning, such as patterns on the recording medium.

The term "sheet-like body" includes not only a sheet of paper but also any material called a recording medium, recording paper, or a recording sheet, such as an overhead projector (OHP) transparency sheet, and textile, to which toner or ink adheres. In the embodiments of the present disclosure described below, the "sheet-like body" indicates a sheet, and the size (dimension), material, shape, and relative positions of the sheet used to describe each of the components and units are examples, and the scope of the present disclosure is not limited thereto unless otherwise specified.

The image forming apparatus 100 includes a tandem image forming section 11 employing the tandem intermediate transfer system. The tandem image forming section 11 includes multiple image forming devices 18Y 18M, 18C, and 18K aligned horizontally. Suffixes Y, M, C, and K represent yellow, magenta, cyan, and black, respectively.

The image forming apparatus 100 includes an endless belt-shaped intermediate transferor 10 situated in a substantially center portion of the image forming apparatus 100. The intermediate transferor 10 of the image forming apparatus 100 may be referred to as an intermediate transfer belt 10 in the following description. The intermediate transfer belt 10 is stretched around and supported by multiple support rollers 14, 15*a*, 15*b*, and 16*a*. The intermediate transfer belt 10 is rotatable clockwise in FIG. 1.

In a configuration illustrated in FIG. 1, the image forming apparatus 100 includes a belt cleaner 17 disposed downstream from one of the support rollers that is a secondary transfer backup roller 16*a* in a direction of rotation of the intermediate transfer belt 10 to clean the intermediate transfer belt 10. The belt cleaner 17 removes residual toner remaining on the intermediate transfer belt 10 after the toner image formed on the intermediate transfer belt is transferred.

Above the intermediate transfer belt 10 stretched taut between the support rollers 14 and 15*a*, the image forming apparatus 100 includes the four image forming devices 18Y, 18M, 18C, and 18K aligned in the direction of rotation of the intermediate transfer belt 10, which form yellow (Y), magenta (M), cyan (C), and black (K) images, respectively.

The four image forming devices 18Y, 18M, 18C, and 18K aligned laterally form the tandem image forming section 11 described above. The image forming devices 18Y, 18M, 18C, and 18K in the tandem image forming section 11 include photoconductor drums 40Y, 40M, 40C, and 40K as image bearers to bear an yellow toner image, a magenta toner image, a cyan toner image, and a black toner image, respectively.

Above the tandem image forming section 11, the image forming apparatus 100 includes two exposure devices 12. The left exposure device 12 is disposed opposite the two image forming devices 18Y and 18M. The right exposure device 12 is disposed opposite the two image forming devices 18C and 18K. Each of the exposure devices 12 employs an optical scanning system and includes a light source device such as a semiconductor laser, a semiconductor laser array, or a multi-beam light source. In addition, each of the exposure devices 12 includes a coupling optical system, a common light deflector such as a polygon mirror, and a dual-system scanning image forming optical system.

The exposure devices 12 expose the photoconductor drums 40Y, 40M, 40C, and 40K according to yellow, magenta, cyan, and black image data, forming electrostatic latent images on the photoconductor drums 40Y, 40M, 40C, and 40K, respectively. A charger, a developing device, and a photoconductor cleaner are disposed around each of the photoconductor drums 40Y, 40M, 40C, and 40K in each of the image forming devices 18Y, 18M, 18C, and 18K. The charger uniformly charges the photoconductor drum prior to exposure. The developing device develops an electrostatic latent image formed by exposure with each of yellow, magenta, cyan, and black toner. The photoconductor cleaner removes residual toner remaining on the photoconductor drum.

In addition, the image forming apparatus 100 includes primary transfer rollers 62Y, 62M, 62C, and 62K at primary transfer positions to transfer the yellow toner image, the magenta toner image, the cyan toner image, and the black toner image from the photoconductor drums 40Y, 40M, 40C, and 40K onto the intermediate transfer belt 10. As a result, a full-color toner image is formed on the intermediate transfer belt 10. The primary transfer rollers 62Y, 62M, 62C, and 62K are opposite the photoconductor drums 40Y, 40M, 40C, and 40K, and the intermediate transfer belt 10 is sandwiched between the primary transfer rollers 62Y, 62M, 62C, and 62K and the photoconductor drums 40Y, 40M, 40C, and 40K. The primary transfer rollers 62Y, 62M, 62C, and 62K function as primary transferors.

Among the multiple support rollers that support the intermediate transfer belt 10, the support roller 14 is a drive roller that rotationally drives the intermediate transfer belt 10 and is connected to a motor via a drive transmission mechanism such as a gear, a pulley, or a belt. When the image forming apparatus 100 forms a black monochrome image on the intermediate transfer belt 10, a transfer mechanism moves the support rollers 15*a* and 15*b* other than the support roller 14 to separate the intermediate transfer belt 10 from the photoconductor drums 40Y, 40M, and 40C. In addition to the multiple support rollers 14, 15*a*, 15*b*, and 16*a*, a backup roller 63 is disposed to support the intermediate transfer belt 10 from outside the loop formed by the intermediate transfer belt 10.

A secondary transfer device 13 is disposed opposite the tandem image forming section 11 via the intermediate transfer belt 10. In the secondary transfer device 13, a secondary transfer roller 16*b* is pressed against the secondary transfer backup roller 16*a* via the intermediate transfer belt 10 and a transfer electrical field is applied to the sheet P to transfer the toner image from the intermediate transfer belt 10 onto the sheet P.

Downstream from the secondary transfer device 13 in a direction of conveyance of the sheet P, the fixing device 20 is disposed to fix the toner image transferred onto the sheet P. A conveyance belt 38 supported by two conveyance rollers 37 conveys the sheet P onto which the toner image is transferred in the secondary transfer device 13 to the fixing device 20. Instead of the conveyance belt 38, for example, a stationary guide and a conveyance roller may be used. The image forming apparatus 100 includes a sheet reversing device 39 below the tandem image forming section 11, the secondary transfer device 13, and the fixing device to reverse and convey the sheet P and print another toner image on the back side of the sheet P.

To provide a fuller understanding of the embodiments of the present disclosure, a description is now given of an image forming operation together with conveyance of the sheet P in the image forming apparatus 100, with continued reference to FIG. 1.

Initially, one of sheet feeding rollers 42 in the sheet feeding table 200 is selected and rotated to pick up and feed the sheets P from one of the multiple sheet feeding trays 44 layered in a sheet bank 43. A separation roller 45 separates the sheet P from other sheets P resting on the sheet feeding tray 44 and feeds the sheet P to a first conveyance passage

46. A sheet feeding conveyance roller pair 47 conveys the sheet P along the first conveyance passage 46 to a second conveyance passage 48 in the image forming apparatus 100, and a leading edge of the sheet P contacts a registration roller pair 49 as a positioning roller pair, which halts the sheet temporarily.

Instead of feeding the sheet P from the sheet feeding table 200, the sheet P may be manually imported into the image funning apparatus 100 by use of a bypass feeder 51, on which a plurality of sheets are placed. A sheet feeding roller 50 is rotated to pick up the sheets from the bypass feeder 51 and send the sheets to a separation roller 52. The separation roller 52 separates the sheets and sends the sheet P to a bypass conveyance passage 53 one by one. Like the sheet P conveyed from the sheet feeding table 200, the leading edge of the sheet P conveyed from the bypass feeder 51 contacts the registration roller pair 49 and stops temporarily.

Subsequently, in synchronization with movement of the full-color toner image formed on the intermediate transfer belt 10, the registration roller pair 49 rotates to send the sheet P to a secondary transfer position between the intermediate transfer belt 10 and the secondary transfer roller 16*b*. Then, the full-color toner image formed on the intermediate transfer belt 10 is collectively transferred from the intermediate transfer belt 10 onto the sheet P.

The conveyance belt 38 conveys the sheet P bearing the full-color toner image to the fixing device 20 according to the present embodiment. Thereafter, the fixing device 20 applies heat and pressure to the full-color toner image on the sheet P to fix the full-color toner image onto the sheet P. An ejection roller pair 56 ejects the sheet P having the fixed toner image to an output tray 57, and the sheet P is stacked on the output tray 57.

In duplex printing, after the full-color toner image is fixed on one side of the sheet P, the sheet P is conveyed to a sheet reversing device 39, turned upside down, and conveyed again to the secondary transfer position. At the secondary transfer position, another full-color toner image is transferred onto the back side of the sheet P. The sheet P is then conveyed to the fixing device 20 that fixes another full-color toner image onto the back side of the sheet P. Thereafter, the ejection roller pair 56 ejects the sheet P to the output tray 57. The following describes the fixing device 20.

Figure 2:
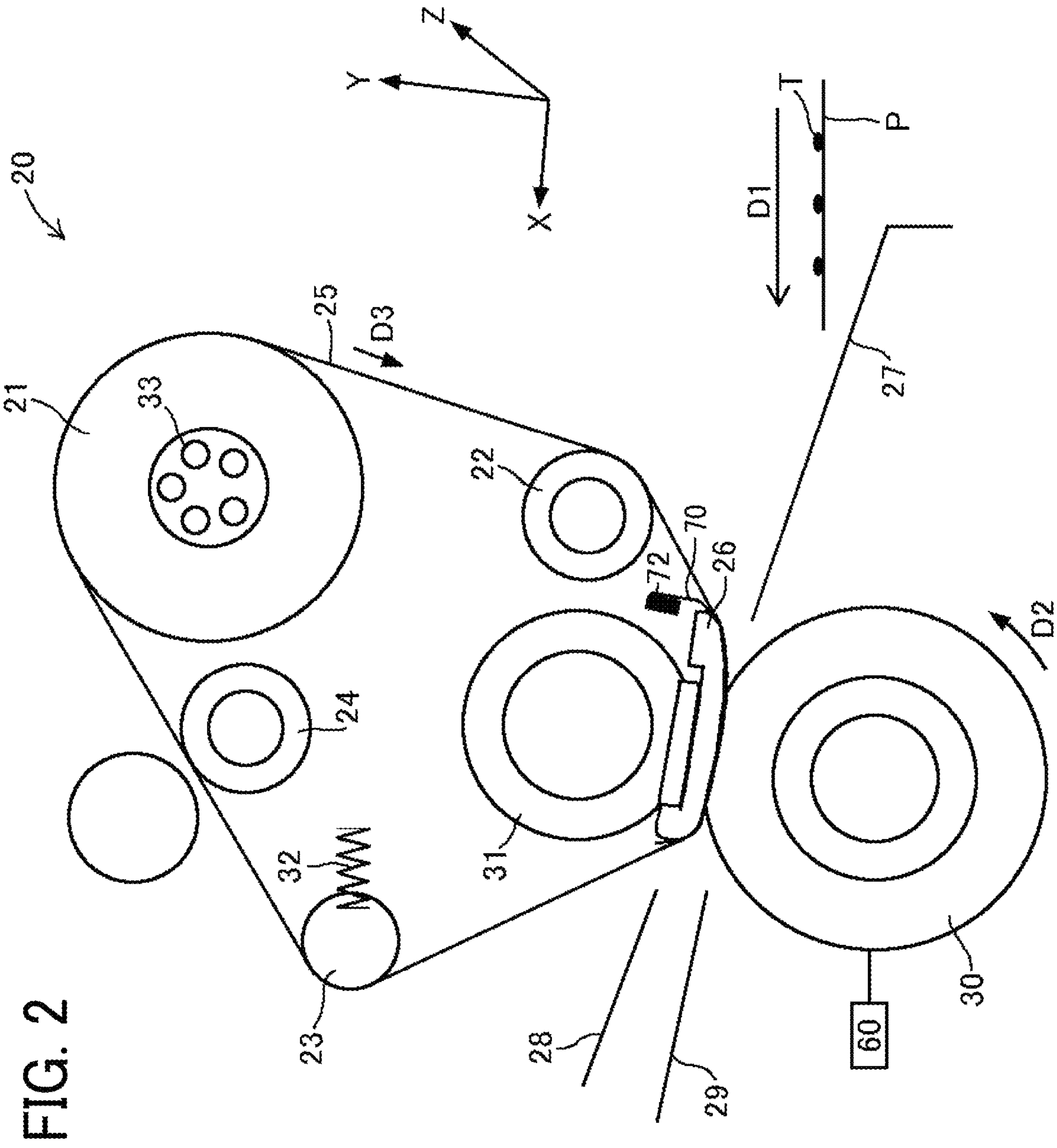
FIG. 2 is a cross-sectional view of a fixing device according to an embodiment of the present disclosure, illustrating a schematic configuration of the fixing device.

FIG. 2 is a cross-sectional view of the fixing device 20 according to an embodiment of the present disclosure, illustrating a schematic configuration of the fixing device 20. The fixing device 20 includes multiple support rollers 21, 22, 23, and 24, an endless fixing belt 25 as an endless belt stretched between the support rollers 21, 22, 23, and 24 and a nip formation pad 26, and a pressure roller 30 as a pressure rotator disposed so as to come into contact with and separate from the fixing belt 25. Instead of the pressure roller 30, a pressure belt may be used.

The multiple support rollers 21, 22, 23, and 24 include a fixing roller 21 driven to rotate by a driver and including a heater, belt support rollers 22 and 24, and a pressure adjustment roller 23 which a biasing member 32 such as a spring presses. Instead of the driver to rotate the fixing roller 21, a motor as the driver may rotate the pressure roller 30, and the rotation of the pressure roller 30 may drive the fixing belt 25 to rotate. The pressure roller 30 is pressed against the nip formation pad 26 via the fixing belt 25 to form a fixing nip between the nip formation pad 26 and the pressure roller 30.

In FIG. 2, the pressure roller 30 contacts the fixing belt 25. The pressure roller 30 and the fixing belt 25 that contact each other heat and melt an unfixed toner image T formed on the sheet P at the fixing nip to fix the toner image T on the sheet P.

The sheet P on which the toner image is formed enters the fixing nip from an entrance guide 27 and is ejected to an exit guide 29. A separator 28 is disposed close to the fixing belt 25 downstream from a nip exit to prevent the sheet P ejected from the fixing nip from being wound around the fixing belt 25.

The following describes the nip formation pad 26.

A frame of the fixing device 20 supports a rigid support 31 inserted into the loop of the fixing belt 25 to support and fix the nip formation pad 26 inside the loop of the fixing belt 25. Accordingly, even if the nip formation pad 26 receives a pressing force of the pressure roller 30, the nip formation pad 26 is not displaced and bent by the pressing force and stably forms a uniform nip width. Controlling the pressing force (in other words, pressure) of the pressure roller 30 pressing against the nip formation pad 26 enables controlling the nip width of the fixing nip.

Preferably, the nip formation pad 26 is made of heat-resistant material. The heat-resistant material prevents thermal deformation of the nip formation pad 26 at temperatures in a fixing temperature range desirable to fix the toner image on the sheet P. As a result, the nip formation pad 26 made of heat-resistant material retains the nip stably and stabilizes output image quality. The heat-resistant material of the nip formation pad 26 may be, for example, typical heat-resistant resin such as polyether sulfone (PES), polyphenylene sulfide (PPS), liquid crystal polymer (LCP), polyether nitrile (PEN), polyamide imide (PAI), and polyether ether ketone (PEEK).

With reference to FIG. 2, the length of the nip formation pad 26 in a Z-direction (that is a direction perpendicular to the surface of the paper on which FIG. 2 is drawn) is shorter than a length of the fixing belt 25 in the Z-direction. The nip formation pad 26 has a nip formation surface extending in a sheet conveyance direction D1 (in other words, a recording medium conveyance direction) along which the sheet P is conveyed. To reduce the sliding friction while the fixing belt 25 slides along the nip formation pad 26, the nip formation pad 26 has both ends of the nip formation surface each processed into a round shape, and a sliding sheet 70 covers the surface of the nip formation pad 26.

The following describes the sliding sheet 70.

A holder 72 holds an upstream end portion of the sliding sheet 70 in the rotation direction D3 of the fixing belt. The sliding sheet 70 is made of a woven fabric or a nonwoven fabric and may be impregnated with a lubricant such as silicone oil. The holder 72 is fixed and supported by the frame of the fixing device 20 and disposed inside the loop of the fixing belt 25. The sliding sheet 70 and the holder 72 are characteristic configurations of the present embodiment and are described in detail later.

A description of the belt support roller 22 is given below

The belt support roller 22 is disposed near the nip formation pad 26 and upstream from the nip formation pad 26 in a rotation direction of the fixing belt 25 and is driven to rotate by the rotation of the fixing belt 25. A position of the belt support roller 22 with respect to the nip formation pad 26 defines an angle between the fixing belt 25 and the nip formation surface of the nip formation pad 26, that is, the angle between the fixing belt 25 entering the nip formation surface and a normal line to the nip formation surface of the nip formation pad 26 that is an X-direction surface.

The pressure adjustment roller 23 is described below.

The pressure adjustment roller 23 is disposed downstream from the nip formation pad 26 in the rotation direction of the fixing belt 25 and is driven to rotate by the rotation of the fixing belt 25. A biasing member 32 presses the pressure adjustment roller 23 to press the fixing belt 25 outward and applies tension to the fixing belt 25. The biasing member 32 may be, for example, a compression spring.

The fixing roller 21 is described below.

The fixing roller 21 is disposed upstream from the belt support roller 22 in the rotation direction of the fixing belt 25. A heater 33 is disposed inside the fixing roller 21 to heat the fixing roller 21. The fixing roller 21 heated by the heater 33 heats the fixing belt 25. The heater 33 may include a halogen heater or a nichrome wire.

A controller may control the heater 33 based on, for example, detection results of a surface temperature of the fixing belt 25 that contacts the fixing roller 21. The fixing roller 21 is driven to rotate by the rotation of the fixing belt 25 while the pressure roller 30 contacts the fixing belt 25, but, after the pressure roller 30 separates from the fixing belt 25, the driver coupled to fixing roller 21 independently rotates to rotate the fixing belt 25.

The pressure roller 30 is described below.

The pressure roller 30 includes, for example, a tubular cored bar made of SUS 304 that is a type of steel use stainless (SUS) defined by Japanese Industrial Standard (JIS) and an elastic layer coating the cored bar with fluoro rubber, silicone rubber, or silicone rubber foam. A heater as a heat source may be disposed inside the tubular cored bar. The heater disposed inside the tubular cored bar can prevent temperature drop in the fixing nip. The heater may include a halogen heater or a nichrome wire.

The pressure roller 30 is moved in the Y-direction in FIG. 2 by a contact-separation mechanism 60. For example, the movement of the pressure roller 30 in the positive Y-direction causes the pressure roller 30 to contact and press against the nip formation pad 26 via the fixing belt 25 and form the fixing nip. On the other hand, the movement of the pressure roller 30 in the minus Y-direction causes the pressure roller 30 to separate from the fixing belt 25.

The image forming apparatus 100 includes a driver to drive and rotate the pressure roller 30, and the driver rotates the pressure roller 30 in a direction indicated by an arrow D2 in FIG. 2. The pressure roller 30 contacting the fixing belt 25 rotates the fixing belt 25 in a direction indicated by an arrow D3, which is referred to as the rotation direction of the fixing belt.

The fixing belt 25 as a fixing rotator is an endless belt having a multilayer structure, such as a two-layered belt including a base and a release layer or a three-layered belt including the base, an elastic layer, and the release layer. The surface of the fixing belt 25 having a three-layered structure including the elastic layer easily adheres to the toner image and enhances the image quality.

A description is given below of a characteristic configuration regarding the sliding sheet according to the present embodiment of the present disclosure.

Figure 3:
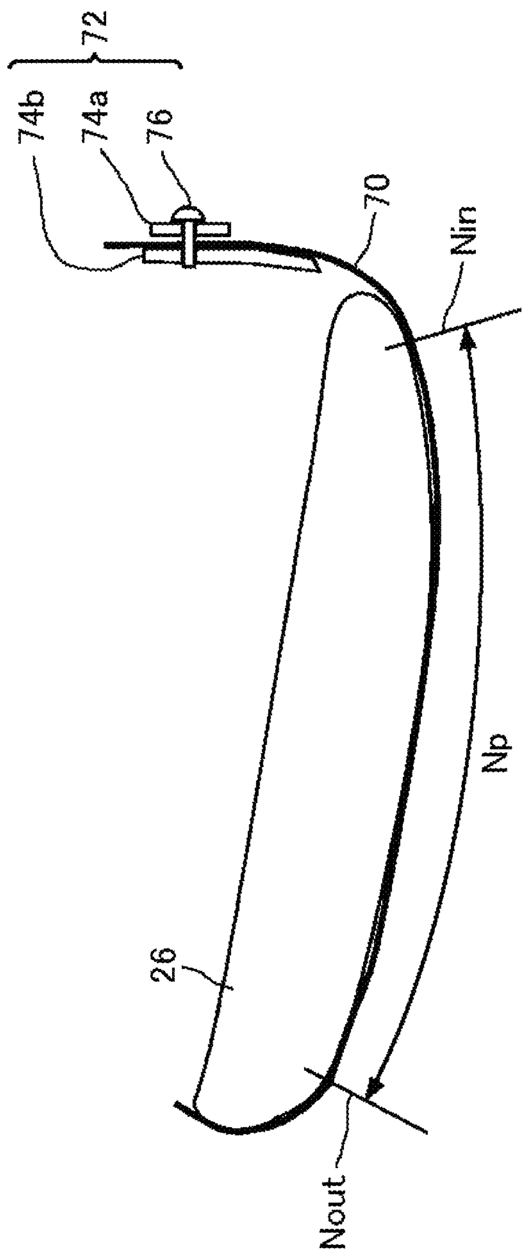
FIG. 3 is a schematic diagram of a nip formation pad, a sliding sheet covering the nip formation pad, and a holder holding the sliding sheet, according to an embodiment of the present disclosure.

FIG. 3 is a schematic diagram of the sliding sheet 70 covering the nip formation pad 26, and the holder 72 holding the sliding sheet 70, according to the present embodiment. The sliding sheet 70 between the nip formation pad 26 and the fixing rotator 25 covers the nip formation pad 26 to reduce friction caused by the rotation of the fixing belt 25. The sliding sheet 70 enables smooth running of the fixing belt 25. The holder 72 is disposed upstream from the nip formation pad 26 in the rotation direction of the fixing belt to hold an upstream end portion of the sliding sheet 70 upstream from the nip formation pad 26 in the rotation direction.

The pressure roller 30 is pressed against the nip formation pad 26 and contacts the fixing belt 25 to form the fixing nip. The fixing nip is defined as a region in which the pressure roller 30 contacts the fixing belt 25. Applying heat and pressure to the toner image in the fixing nip fixes the toner image onto the sheet. The fixing nip is determined so as to sufficiently fix the toner image onto the sheet. The sliding sheet 70 on the nip formation pad 26 faces the fixing nip, A region facing the fixing nip on the sliding sheet 70 is referred to as a nip region Np. An upstream edge of the nip region Np in the rotation direction of the fixing belt is referred to as a nip entrance Nin, and a downstream edge of the nip region Np in the rotation direction of the fixing belt is referred to as a nip exit Nout.

To examine a real fixing nip in the image forming apparatus, for example, the following methods are used. Exchanging the sliding sheet 70 for a thermochromic sheet such as an overhead projector transparency (OHP sheet) and driving the fixing device for a short time (ex, five minutes) discolors the thermochromic sheet. Examining the discolored area in the thermochromic sheet can specify the area of the fixing nip N and the position of the entrance of the fixing nip. Alternatively, measuring the center position of rotation of the pressure roller, the diameter of the pressure roller, and the position of the sliding pad can specify the area of the fixing nip N and the position of the entrance of the fixing nip.

The holder 72 includes two holding plates 74*a* and 74*b* and multiple fasteners 76. The sliding sheet 70 has multiple insertion holes. Both sides of the upstream end portion of the sliding sheet 70 are sandwiched by the two holding plates 74*a* and 74*b*, and the fasteners 76 are inserted into the insertion holes to fasten the two holding plates 74*a* and 74*b*. As a result, the two holding plates 74*a* and 74*b* hold the upstream end portion of the sliding sheet 70.

Examples of fastening methods are as follows. Multiple through holes facing the multiple insertion holes of the sliding sheet 70 are made in one of the two holding plates, and multiple screw holes facing the multiple insertion holes of the sliding sheet 70 are made in the other one of the two holding plates. Bolts can pass through the through holes, the insertion holes and be screwed into the screw holes to fasten the holding plates and hold the sliding sheet. Alternatively, bolts and nuts may be used as the fasteners to fasten the two holding plates 74*a* and 74*b*.

Figure 4:
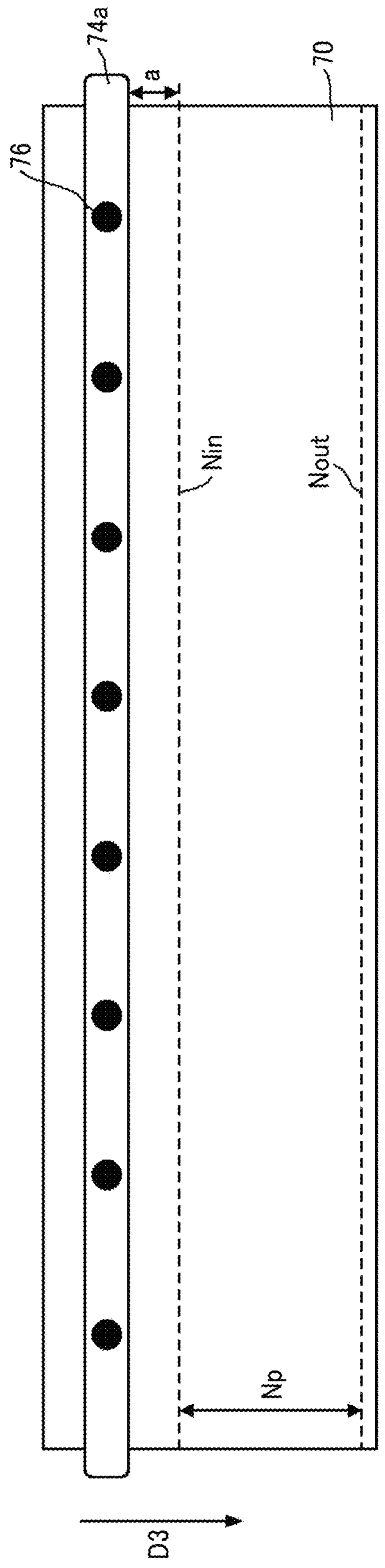
FIG. 4 is a plan view of the sliding sheet of FIG. 3, a holding plate disposed on the sliding sheet, and fasteners inserted into holes of the holding plate to illustrate a schematic configuration of the sliding sheet and the holder.

FIG. 4 is a plan view of the sliding sheet 70 of FIG. 3, a holding plate 74*a* disposed on the sliding sheet 70, and fasteners inserted into the through holes of the holding plate 74*a* to illustrate a schematic configuration of the sliding sheet 70 and the holder 72.

The multiple fasteners 76 and the holding plates 74*a* and 74*b* hold the upstream end portion of the sliding sheet 70 in the rotation direction D3 of the fixing belt.

The holding plate 74*a* is on the face of the sliding sheet 70, and the face of the sliding sheet 70 contacts the fixing belt 25. In the above-described structure, wrinkles and wavy deformation occur on a part of the sliding sheet 70. The wrinkles and the wavy deformation adjacent to a nip entrance of the fixing nip on the sliding sheet deform an outer circumferential surface of the fixing belt adjacent to the nip entrance, which causes streak-like abnormal images (i.e., white streaks) due to fixing unevenness.

The following experiments were performed and found that changing the holding plate 74*a* solves the above-described disadvantage. Specifically, fixing devices having different distances “a” were produced for experiments. The distance “a” is from the nip entrance Nin to one edge of the holding plate 74*a* that is closer to the nip entrance NM than the other edge of the holding plate 74*a*. The produced fixing device was installed in the image forming apparatus, a black image was printed on an entire sheet, and whether the white streak occurred was investigated. The results of the experiments were as follows.

TABLE 1

| DISTANCE “a” (mm) | OCCURRENCE OF WHITE STREAK |
|---|---|
| 2 | The white streaks occurred |
| 3 | The white streaks occurred |
| 4 | The white streaks occurred |
| 5 | The white streak did not occur |
| 6 | The white streak did not occur |

(The sheet used in the experiments:

The thickness of sheet: 42 g/m2

The size of sheet: SRA3 (320 mm×450 mm)

The sheet is commercially supplied by OJI F-TEX)

As a result, it was found that designing the distance “a” to be 5 mm or more can prevent the occurrence of the white streak. In other words, as illustrated in FIG. 4, a distance “a” from one edge of the holding plate 74*a* to the nip entrance Nin is equal to or greater than 5 mm (a≥5 mm). The one edge of the holding plate 74*a* is closer to the nip entrance NM than the other edge of the holding plate 74*a*.

The above-described configuration can prevent the wrinkles and wavy deformation in the sliding sheet 70 from occurring in a portion close to the nip entrance NM. In other words, the above-described configuration can prevent the wrinkles and wavy deformation in the sliding sheet 70 from reaching the portion close to the nip entrance NM. As a result, the outer circumferential surface of the fixing belt 25 does not deform near the nip entrance, which can avoid the occurrence of streak-like abnormal images (i.e., white streaks) due to fixing unevenness.

On the other hand, the sliding sheet 70 having a too long distance “a” is likely to bend when the fixing belt is assembled on the sliding sheet 70, which causes disadvantages. Preferably, the distance “a” is equal to or smaller than 30 mm. The sliding sheet 70 having the distance “a” equal to or smaller than 30 mm can prevent the disadvantages.

Figure 5:
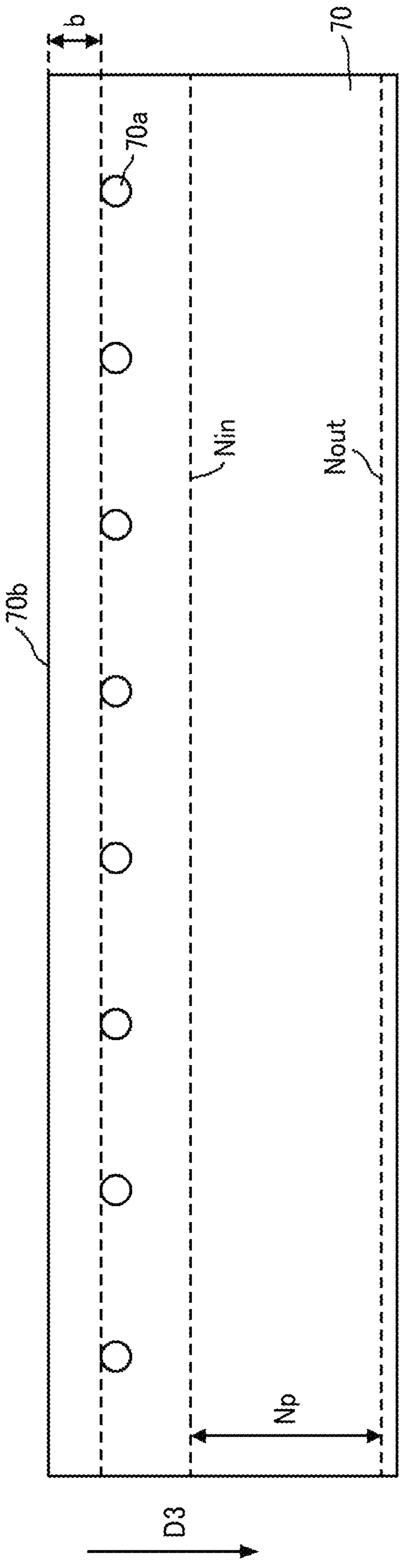
FIG. 5 is another plan view of the sliding sheet of FIG. 3.

FIG. 5 is another plan view of the sliding sheet 70 covering the nip formation pad 26. Dashed lines in FIG. 5 mean the nip entrance Nin, the nip exit Nout, and a straight line connecting upstream edges of insertion holes 70*a* in the rotation direction D3 of the fixing belt.

The sliding sheet 70 has the multiple insertion holes 70*a* arranged in a direction orthogonal to the rotation direction D3 of the fixing belt and disposed in an upstream end portion of the sliding sheet 70 in the rotation direction D3 of the fixing belt. The sliding sheet is constantly pulled with a high load in the sheet conveyance direction, the insertion holes are likely to gradually extend toward the upstream side in the sheet conveyance direction. The sliding sheet is gradually shifted to the downstream side, and finally, the insertion hole may reach the edge of the sliding sheet. As a result, the sliding sheet may be broken.

The following experiments were performed and found that designing a distance “b” from an upstream edge of the insertion hole 70*a* in the rotation direction of the fixing belt to an upstream edge 70*b* of the sliding sheet 70 in the rotation direction to be 5 mm or more solved the above-described disadvantage. Specifically, the fixing devices having different distances “b” were produced for experiments. The produced fixing device was continuously driven for ten hours, and it was investigated whether the sliding sheet was broken. The experiment results were as follows.

TABLE 2

| DISTANCE “b” (mm) | DAMAGE OF SLIDING SHEET |
|---|---|
| 2 | The sliding sheet was broken. |
| 3 | The sliding sheet was broken. |
| 4 | The sliding sheet was broken. |
| 5 | The sliding sheet was not broken. |
| 6 | The sliding sheet was not broken. |

As a result, it was found that designing the distance “b” to be 5 mm or more can prevent the breakage of the sliding sheet. In other words, a distance “b” from the upstream edge of the insertion hole 70*a* in the rotation direction D3 to the upstream edge 70*b* of the sliding sheet 70 in the rotation direction D3 is equal to or greater than 5 mm (b≥5 mm) as illustrated in FIG. 5.

The above-described configuration can increase the tensile strength of a portion around the insertion hole 70*a* in the sliding sheet 70. As a result, the above-described configuration can prevent the insertion hole 70*a* from enlarging upstream in the rotation direction of the fixing belt and reaching the edge of the sliding sheet 70.

On the other hand, a too long distance “b” increases the cost of the sliding sheet and causes difficulty in arranging the sliding sheet in the fixing device. In view of the layout of parts in the fixing device and the cost of the fixing device, designing the distance “b” to be 50 mm or less is preferable.

As described above, the fixing device 20 according to the present embodiment can prevent the wrinkles and wavy deformation having occurred near the holder 72 in the sliding sheet 70 from reaching the nip entrance Nin and can prevent the insertion hole 70*a* from reaching the edge 70*b* of the sliding sheet 70. In addition, the sliding sheet 70 does not need to have a hole or a cut except for the multiple insertion holes 70*a*. As a result, the above-described configuration can also maintain reliability.

The embodiments of the present disclosure have been described in detail above. The above-described embodiments are examples and can be modified within the scope not departing from the gist of the present disclosure.

The above-described embodiments are illustrative and do not limit the present disclosure. Thus, numerous additional modifications and variations are possible in light of the above teachings For example, elements and/or features of the embodiment and variation may be combined with each other and/or substituted for each other within the scope of the present disclosure.

The advantages achieved by the embodiments described above are examples and therefore are not limited to those described above.

The invention claimed is:

1. A fixing device comprising:

a fixing rotator forming a loop and rotatable in a rotation direction of the fixing rotator;

a nip formation pad inside the loop of the fixing rotator;

a pressure rotator pressed against the nip formation pad via the fixing rotator to form a fixing nip between the fixing rotator and the pressure rotator;

a sliding sheet between the nip formation pad and the fixing rotator, the sliding sheet covering the nip formation pad and having a nip entrance at an upstream end of the fixing nip in the rotation direction and a face contacting the fixing rotator; and a holder to hold an upstream end portion of the sliding sheet upstream from the nip formation pad in the rotation direction, the holder including a holding plate on the face of the sliding sheet, the holding plate separated from the nip entrance by 5 mm or more in the rotation direction, wherein the sliding sheet has an insertion hole in the upstream end portion, the holder includes a fastener inserted into the insertion hole, and a distance from an upstream edge of the sliding sheet to an upstream edge of the insertion hole in the rotation direction is 5 mm or more.

2. The fixing device according to claim 1, wherein the sliding sheet has multiple insertion holes including the insertion hole in the upstream end portion, the holder includes multiple fasteners including the fastener respectively inserted into the multiple insertion holes, and a distance from an upstream edge of the sliding sheet to an upstream edge of each of the insertion holes in the rotation direction is 5 mm or more.

3. The fixing device according to claim 2, wherein the holder includes another holding plate, and the holding plate and said another holding plate sandwich the upstream end portion of the sliding sheet.

4. The fixing device according to claim 3, wherein the holding plate has a through hole, said another holding plate has a screw hole, and the fastener includes a bolt passing through the through hole of the holding plate and the insertion hole of the sliding sheet and screwed into the screw hole of said another holding plate.

5. An image forming apparatus comprising the fixing device according to claim 1.

6. The image forming apparatus according to claim 5, further comprising:

a tandem intermediate transfer system comprising image forming devices for a plurality of colors, and a secondary transfer device disposed between the intermediate transfer system and the fixing device, and at least two transfer belts to convey a target sheet from the intermediate transfer system to the secondary transfer device and from the secondary transfer device to the fixing device.

7. The image forming apparatus according to claim 6, further comprising a sheet reversing device between the tandem intermediate transfer system and the secondary transfer device, the sheet reversing device being configured to reverse the target sheet from a front side to a back side thereof.

8. The image forming apparatus according to claim 6, wherein the image forming apparatus is one of a copier, a printer, and a fax machine.

9. The fixing device according to claim 1, further comprising a heater to heat the fixing rotator, and a controller configured to control the heater based on a surface temperature of the fixing rotator.

10. The fixing device according to claim 9, wherein the heater is disposed within the fixing rotator.

11. The fixing device according to claim 10, wherein the heater includes one of a halogen heater or a nichrome wire.

12. The fixing rotator according to claim 1, wherein the pressure rotator includes a steel tubular core and an elastic layer coating the steel tubular core.

13. The fixing rotator according to claim 1, wherein the sliding sheet is impregnated with a lubricant.

14. The fixing rotator according to claim 13, wherein the lubricant is a silicone oil.

15. The fixing rotator according to claim 13, wherein the sliding sheet is made of a woven fabric.

16. The fixing rotator according to claim 13, wherein the sliding sheet is made of a nonwoven fabric.

* * * * *